United States Patent [19]

Radigon et al.

[11] Patent Number: 6,162,868
[45] Date of Patent: *Dec. 19, 2000

[54] PRESSURE-SENSITIVE ADHESIVE WHICH CAN BE APPLIED WHILE HOT

[75] Inventors: Eric Radigon, Bernay; Jean Lebez, Evreux; Jean-Michel Pierrot, Grosley sur Risle, all of France

[73] Assignee: Elf Atochem S.A., Puteaux, France

[*] Notice: This patent issued on a continued prosecution application filed under 37 CFR 1.53(d), and is subject to the twenty year patent term provisions of 35 U.S.C. 154(a)(2).

[21] Appl. No.: 09/159,614

[22] Filed: Sep. 24, 1998

[30] Foreign Application Priority Data

Sep. 30, 1997 [FR] France ................................. 97 12136

[51] Int. Cl.⁷ .............................. C08L 31/00; C08L 53/00
[52] U.S. Cl. ................................ 525/88; 525/94; 525/98; 524/270; 524/271; 524/272; 524/560
[58] Field of Search ..................................... 524/270, 560, 524/271, 272; 525/94, 98, 88

[56] References Cited

U.S. PATENT DOCUMENTS

| | | | |
|---|---|---|---|
| 4,745,139 | 5/1988 | Haasl et al. | 523/149 |
| 5,373,041 | 12/1994 | Prejean | 524/143 |
| 5,401,792 | 3/1995 | Babu et al. | 524/270 |
| 5,639,521 | 6/1997 | Fraus et al. | 428/8 |
| 5,703,162 | 12/1997 | Anderson | 525/89 |

FOREIGN PATENT DOCUMENTS

| | | |
|---|---|---|
| 0298319 | 1/1989 | European Pat. Off. . |
| 0 451 919 A2 | 10/1991 | European Pat. Off. . |
| 0 451 920 A2 | 10/1991 | European Pat. Off. . |
| 0664327 | 7/1995 | European Pat. Off. . |
| 2 223 023 | 3/1990 | United Kingdom . |
| 2 290 298 | 12/1995 | United Kingdom . |
| WO 9513332 | 5/1995 | WIPO . |
| WO 9530721 | 11/1995 | WIPO . |

*Primary Examiner*—P. Hampton-Hightower
*Attorney, Agent, or Firm*—Smith, Gambrell & Russell, LLP

[57] ABSTRACT

The present invention relates to a pressure-sensitive adhesive comprising:

a mixture of a block copolymer (A) comprising polystyrene blocks and polybutadiene or polyisoprene blocks which are optionally hydrogenated and of a copolymer (B) of ethylene and of an alkyl (meth)acrylate, at least one tackifying resin and optionally a plasticizer, this adhesive being deposited while hot on a substrate.

These products are useful for self-adhesive labels and tapes.

5 Claims, No Drawings

PRESSURE-SENSITIVE ADHESIVE WHICH CAN BE APPLIED WHILE HOT

FIELD OF THE INVENTION

The present invention relates to a pressure-sensitive adhesive which can be applied while hot.

BACKGROUND OF THE INVENTION

Hot-melt adhesives are thermoplastic materials which are solid at room temperature and which, on heating, become viscous liquids. These viscous liquids are applied to a first substrate and then the substrate is covered with a second surface. On cooling, adhesion is obtained between the substrate and the second surface. The assembly time is the period during which the adhesive which has been applied to a substrate, which is at room temperature, remains tacky, that is to say the interval of time during which it is possible to apply the second surface and, on cooling, to obtain adhesion between the substrate and the second surface.

Once this assembly time period has been exceeded, it is no longer possible to obtain sufficient adhesion between the substrate and the second surface.

These adhesives are denoted by the abbreviation HMA (hot-melt adhesives). Adhesives having an infinite assembly time are useful for self-adhesive labels or adhesive tapes which are used at room temperature. Depending on the nature of the adhesive, it is possible to obtain more or less strong adhesions and, for example, to detach and reattach the label. Bonding is achieved by pressure at room temperature. The adhesive is deposited on the substrate (for example, label or tape) while hot. These adhesives are denoted by HMPSA (hot-melt pressure-sensitive adhesive). The present invention relates to this type of adhesive. They are also sometimes denoted as self-adhesive hot-melt compositions.

According to the prior art, see, for example, Ullmann's Encyclopedia of Industrial Chemistry, 5th edition (1995), Vol. A 26, p. 659–660, HMPSAs are preferably based on SIS (styrene/isoprene/styrene) or SBS (styrene/butadiene/styrene) block copolymers.

Mention has been made, in U.S. Pat. No. 5,373,041, relating to HMPSAS, as disadvantages of SBSs and SISs, of their instability towards heat and towards U.V. radiation, as well as of their poor resistance to oils. Provision has thus been made, in this patent, to replace SBSs and SISs by copolymers composed of 60 to 70% (by weight) of ethylene, 30 to 40% of n-butyl acrylate and from 0 to 5% of (meth) acrylic acid, which can be neutralized by metal ions.

DESCRIPTION OF THE INVENTION

It has now been discovered that mixtures of SBS or SIS block copolymers and of ethylene/alkyl (meth)acrylate copolymers make it possible to prepare HMPSA adhesives with properties which can be chosen from a wide range of values.

The advantage of the adhesives of the invention is that it is possible, by choosing the proportions of block copolymer, to determine the type of failure between the substrate and the second surface.

Another advantage of the invention is that the (SBS or SIS) block copolymer contributes adhesive failure and good finger tack, whereas the copolymer of ethylene and of alkyl (meth)acrylate contributes good creep behaviour and better adhesion to steel than the block copolymer.

The prior art, U.S. Pat. No. 5,401,792, has already described HMAs containing these SBS or SIS block copolymers, ethylene/alkyl (meth)acrylate copolymers and a tackifying resin. These HMAs are particularly chosen when the HMA has to be deposited on a substrate by ejecting in the form of molten fibres. The assembly time is between 10 and 180 seconds depending on the compositions. These compositions are not HMPSAs.

The present invention is thus a pressure-sensitive adhesive comprising:
 a mixture of a block copolymer (A) comprising polystyrene blocks and polybutadiene or polyisoprene blocks which are optionally hydrogenated and of a copolymer (B) of ethylene and of an alkyl (meth)acrylate,
 a tackifying resin and optionally a plasticizer.

These adhesives are deposited while hot (molten) on a substrate, such as, for example, a tape made of paper or of polyamide, polyolefin or polyester. On cooling, a face is obtained which is adhesive at room temperature. This adhesive face can be protected before use by a silicone-containing paper or the other face of the substrate (rolling up of an adhesive tape on itself).

The block copolymers (A) are described in Ullmann's, already cited above, Vol. A 26, pages 655–659. They are advantageously copolymers of formula C-D-C or of formula

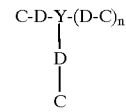

in which n has the value 1, 2 or 3 and C and D represent blocks. The blocks C represent polymerized styrene and the blocks D polymerized butadiene, polymerized isoprene or a mixture of polymerized butadiene and isoprene. The blocks D can be hydrogenated (they are then, for example, SEBSs).

Y is a polyfunctional entity originating, for example, from polyfunctional coupling agents which are used in the manufacture of star-shaped block copolymers. Such agents, as well as these block copolymers, are described in U.S. Pat. No. 3,639,521, the contents of which are incorporated in the present application.

Preferred star-shaped block copolymers contain 15 to 45% by weight and better still 25 to 35% of styrene units. The molar mass is at least 140,000 and better still at least 160,000.

Particularly preferred star-shaped block copolymers are those described in EP 451,920. These copolymers are based on styrene and isoprene, the molar mass of the polystyrene blocks is at least 12,000 and the polystyrene content is 35% (weight) at most of the total mass of the block copolymer.

The preferred linear block copolymers have a molar mass between 70,000 and 145,000 and contain 12 to 35% by weight of polystyrene. Particularly preferred linear block copolymers are those based on styrene and isoprene described in European Patent EP 451,919. These copolymers have polystyrene blocks with a molar mass between 14,000 and 16,000 and a polystyrene content of between 25 and 35% by weight of the block copolymer. The molar mass is between 80,000 and 145,000 and better still between 100,000 and 145,000.

As regards the copolymers (B), mention may be made, as examples of alkyl (meth)acrylates, of those in which the alkyl group has from 1 to 10 carbon atoms, such as methyl (meth)acrylate, ethyl (meth)acrylate, n-butyl (meth)acrylate, isobutyl (meth)acrylate and 2-ethylhexyl (meth)acrylate. n-Butyl acrylate is advantageously used.

The (meth)acrylate content is advantageously at most 50% and preferably between 20 and 40% by weight. The melt flow index (or MFI) can be between 0.1 and 1000 and is preferably at least 40 and preferably between 40 and 400 (in g/10 min according to ASTM D 1238-73, conditions E).

When the proportion of (A) is increased with respect to (B), the finger tack increases and, in the loop tack test, there is a change from adhesive mixed failure to adhesive failure.

The loop tack test is the FINAT FTM 9 test described in the FINAT technical manual, Laan Copes Van Cattenbubch 79, NL 2585 EW, THE HAGUE (1995).

This test characterizes the instantaneous adhesion or "tack". The tack is defined as being the force required to detach an HMPSA-coated PET (polyethylene terephthalate) loop, a predetermined surface of which has been brought into contact beforehand with a stainless steel plate.

The HMPSA is coated, between 140 and 180° C., on a 25×400 mm$^2$ PET strip. The thickness being constant, the weight per unit area is between 18 and 22 g/m$^2$. The test strips must be conditioned for at least 4 hours before the test in a controlled-environment room at 23±2° C. and 50±5% RH (relative humidity). The self-adhesive tape is applied using a standardized 2 kg conventional roller.

The test is carried out using a dynamometer, at a rate of 300 mm/min, in a controlled-environment room at 23±2° C. and 50±5% RH.

The loop tack is quantified by the maximum force value. The result of the creep test is given in N/cm. The type of failure must be mentioned.

The various types of failure are defined as follows:

Adhesive Failure

The HMPSA does not adhere to one of the 2 substrates.

Cohesive Failure

A failure in the adhesive seal is observed. In this case, the two adhesively-bonded substrates carry away part of the seal during traction.

Mixed Failure

The failure is indecisive and it is possible to observe, on the same test specimen, both types of failures described above.

When the proportion of (B) is increased, the creep behaviour and the adhesion to the steel are is enhanced.

The creep behaviour is determined by the FTM8 test (FINAT manual already mentioned).

The creep test measures the ability of an HMPSA to withstand a static force of 1 kgf at a given temperature.

The resistance to static shearing is defined by the time necessary to separate, by parallel vertical slippage, an area of 25×25 mm$^2$, coated with HMPSA, from a flat stainless steel plate.

The HMPSA is coated, between 140 and 180° C., on a 25×400 mm$^2$ PET strip. The thickness being constant, the weight per unit area is between 18 and 22 g/m$^2$. The test strips must be conditioned for at least 4 hours before the test in a controlled-environment room at 23±2° C. and 50±15% RH. The self-adhesive tape is applied using a standardized 2 kg conventional roller.

The result of the creep test is given in minutes. The type of failure must be mentioned.

The adhesion to the steel is determined by the FTM1 test (FINAT manual already mentioned).

This test quantifies the adhesiveness. The latter is defined as being the force required to remove a PET strip, coated with HMPSA, from a stainless steel plate.

The HMPSA is coated, between 140 and 180° C., on a 25×400 mm$^2$ PET strip. The thickness being constant, the weight per unit area is between 18 and 22 g/m$^2$. The test strips must be conditioned for at least 4 hours before the test in a controlled-environment room at 23±2° C. and 50±5% RH. The self-adhesive tape is applied using a standardized 2 kg conventional roller.

The adhesive force is measured 20 minutes after application. The test is carried out using a dynamometer, at an angle of 180°, at a rate of 300 mm/min in a controlled-environment room at 23±2° C. and 50±5% RH.

The result of the peel test is given in N/cm. The type of failure must be mentioned.

The adhesives of the invention contain one or more tackifying resins and optionally plasticizers, fillers and stabilizers.

Tackifying resins which are suitable are, for example, rosin, rosin esters, hydrogenated rosin, polyterpenes and derivatives, aromatic or aliphatic petroleum resins or hydrogenated cyclic resins. These resins typically have a ring-and-ball softening temperature of between 25° C. and 180° C. and preferably between 50° C. and 135° C.

The amount of tackifying resin can be from 50 to 180 parts per 100 parts of the mixture of (A) and (B) and preferably 100 to 150 parts.

Other examples of rosin derivatives are described in Ullmann's (cited above), Vol. A 23, p. 79–86, the contents being incorporated in the present application.

Mention may be made, as derivatives of rosin, of those obtained by hydrogenation, dehydrogenation, polymerization or esterification. These derivatives can be used as is or in the form of esters of polyols, such as esters of pentaerythritol, polyethylene glycol and glycerol.

Mention may also be made, as tackifying resin, of dicyclopentadienes.

The plasticizers which can be used in the adhesives of the invention are, for example, paraffinic, aromatic or naphthenic mineral oils. They serve essentially to lower the viscosity and to introduce tack. The amount of plasticizer can be between 10 and 30 parts per 100 parts of the mixture of (A) and (B).

Mention may also be made, as plasticizer, of phthalates, azelates, adipates, tricresyl phosphate and polyesters.

Mention may be made, as examples of fillers, of silica, alumina, glass, glass beads, calcium carbonates, fibres and metal hydroxides. These fillers must not reduce the tack or the mechanical properties of the adhesive after it has been applied. The amount of fillers can represent up to 100 parts per 100 parts of the mixture of (A) and (B).

It is recommended to add stabilizers, such as antioxidants; the usual antioxidants for thermoplastics can be used.

The hot-melt adhesives of the invention are prepared by mixing in the molten state, at temperatures of between 130° C. and 200° C., until a homogeneous mixture is obtained. The duration of mixing can be of the order of 30 minutes to 3 hours. The usual devices for thermoplastics, such as extruders, rollers, Banbury or Brabender mixers or propeller mixers, can be used.

It is recommended to carry out the preparation under nitrogen; this is because the copolymers (A) are very sensitive to oxidation, even when they are protected by phenolic antioxidants of the Irganox type (Ciba Speciality Chemicals product).

EXAMPLES

In the examples, the properties of the adhesives are measured according to the following methods:

Cloud Point

The cloud point is determined as follows: the adhesive is heated to 175° C. and a drop of it is deposited on the bulb of an ASTM thermometer and then the temperature at which cloudiness appears during cooling is recorded.

Brookfield Viscosity

Measured at 170° C., needle 27 at 10 revolutions/minute according to ASTM D 3236.

Peel at 180 degrees: FTM1 already mentioned

Static creep: FTM8 already mentioned

SAFT (shear adhesion failure temperature)

The SAFT test (ASTM D 4498) measures the ability of an HMPSA to withstand a static force of 0.5 kgf under the effect of a steady rise in temperature of 0.4° C./min.

The SAFT is defined by the temperature at which it is possible to observe separation, by a parallel vertical slippage, of an area of $25 \times 25$ mm$^2$, coated with HMPSA, from a flat stainless steel plate.

The HMPSA is coated, between 140 and 180° C., on a $25 \times 400$ mm$^2$ PET strip. The thickness being constant, the weight per unit area is between 18 and 22 g/m$^2$. The test strips must be conditioned for at least 4 hours before the test in a controlled-environment room at $23 \pm 2°$ C. and $50 \pm 5\%$ RH. The self-adhesive tape is applied using a standardized 2 kg conventional roller.

The result of the SAFT is given in 0° C. The type of failure must be mentioned.

Finger Tack (Internal Method)

This test gives an immediate idea of the adhesion of an HMPSA coated on a PET substrate. The finger tack value is between 0 and 3.

0: no tack,

1: insufficient tack,

2: good tack,

3: excellent tack.

Loop tack defined above (FTM9)

The following products were used:

Kraton: block copolymer based on styrene and on isoprene containing 15% by weight of polystyrene of linear type produced by Shell under the reference Kraton D1161N Lotryl: ethylene/n-butyl acrylate copolymer containing 35% by weight of acrylate and with an MFI of 320 g/10 min at 190° C. under 2.16 kg, according to ASTM D 1238-73, conditions E (produced by Elf Atochem)

Permalyn 5095: solid rosin glycerol ester (produced by Hercules)

Dertoline DEG 2: semi-liquid diethylene glycol rosin ester (produced by DRT)

Catenex N 956: aliphatic paraffinic oil (produced by Shell)

Irganox 1010: phenolic antioxidant (produced by Ciba Speciality Chemicals).

The adhesives were formulated according to the proportions (by weight):

35 parts of a Kraton D 1161 N/Lotryl mixture 45 parts Permalyn 5095

15 parts Dertoline DEG 2

5 parts Catenex N 956

0.2 part Irganox 1010.

The results are collated in Tables 1 and 2.

In these tables:

s denotes the standard deviation of the measurement

AF denotes adhesive failure,

CF denotes cohesive failure,

MF denotes mixed failure.

The proportions of Kraton and of Lotryl are in parts by weight.

Tg denotes the glass transition temperature determined by DSC (differential scanning calorimetry).

TABLE 1

| TESTS | UNITS | 35 LOTRYL 0 KRATON | 30 LOTRYL 5 KRATON | 25 LOTRYL 10 KRATON | 20 LOTRYL 15 KRATON | 15 LOTRYL 20 KRATON | 10 LOTRYL 25 KRATON | 5 LOTRYL 30 KRATON | 0 LOTRYL 35 KRATON |
|---|---|---|---|---|---|---|---|---|---|
| Static creep FTM8 PET/Stainless steel | min | >30,000 | 15,000–18,000 | 500–2000 | 300–400 | 150–250 | 100–150 | 30–50 | 30–40 |
| Type of failure | | MF | CF | CF | CF | CF | CF | CF | CF |
| SAFT PET/Stainless steel | ° C. | 61.8 | 59.5 | 55.9 | 54.4 | 49.0 | 51.8 | 50.5 | 47.7 |
| s | | 0.2 | 0.2 | 0.6 | 0.8 | 1.3 | 1.4 | 0.2 | 0.2 |
| Type of failure | | CF | CF | CF | CF | CF | CF | CF | CF |
| Finger tack | — | 1 | 2 | 2 | 2.5 | 2.5 | 3 | 3 | 3 |
| Loop tack FTM9 PET/Stainless steel | N/cm | 15.3 | 13.3 | 11.3 | 8.3 | 8.6 | 11.4 | 10.7 | 5.3 |
| s | | 4.1 | 2.7 | 2.9 | 0.8 | 0.7 | 1.6 | 2.9 | 1.0 |
| Type of failure | | MF | MF | MF | AF | AF | AF | AF | AF |

TABLE 2

| TESTS | UNITS | 35 LOTRYL 0 KRATON | 30 LOTRYL 5 KRATON | 25 LOTRYL 10 KRATON | 20 LOTRYL 15 KRATON | 15 LOTRYL 20 KRATON | 10 LOTRYL 25 KRATON | 5 LOTRYL 30 KRATON | 0 LOTRYL 35 KRATON |
|---|---|---|---|---|---|---|---|---|---|
| Cloud temperature | °C. | >60 | >150 | >150 | >150 | >150 | >150 | >150 | >60 |
| Brookfield viscosity 170° C. 10 rev/min, Nee. 27 | mpa·s | 1830 | 2550 | 3880 | 5650 | 7920 | 11,340 | 13,570 | 19,200 |
| Tg (DSC) | °C. | −18 | −21 | −22 | −27 | −30 | −30 | −29 | −32 |
| Peel at 180° FTM1 PET/Stainless steel | N/cm | 10.9 | 11.7 | 11.0 | 6.3 | 7.4 | 8.6 | 7.6 | 7.3 |
| s | | 0.4 | 0.7 | 0.3 | 1.0 | 0.5 | 0.5 | 0.9 | 0.6 |
| Type of failure | | CF | CF | MF | AF | AF | AF | AF | AF |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Pressure-sensitive adhesive comprising:

a mixture of block copolymer (A) comprising polystyrene blocks and polybutadiene or polyisoprene blocks which are optionally hydrogenated and of a copolymer (B) of ethylene and of an alkyl (meth)acrylate, at least one tackifying resin and optionally a plasticizer, this adhesive being deposited while hot on a substrate, wherein the adhesive has an infinite assembly time.

2. Adhesive according to claim 1, wherein (B) is a copolymer of ethylene and of n-butyl acrylate.

3. Adhesive according to claim 1, wherein the amount of tackifying resin is from 50 to 180 parts (by weight) per 100 parts of the mixture of (A) and (B).

4. Adhesive according to claim 1, wherein the amount of plasticizer is from 10 to 30 parts per 100 parts of the mixture of (A) and (B).

5. Adhesive according to claim 3, wherein the amount of tackifying resin is from 100 to 150 parts.

* * * * *